United States Patent [19]

Troebel

[11] Patent Number: 4,491,897
[45] Date of Patent: Jan. 1, 1985

[54] PLUG-IN BASE FOR LOW-VOLTAGE CIRCUIT BREAKERS

[75] Inventor: Werner Troebel, Berlin, Fed. Rep. of Germany

[73] Assignee: Siemens Aktiengesellschaft, Berlin and Munich, Fed. Rep. of Germany

[21] Appl. No.: 338,974

[22] Filed: Jan. 12, 1982

[30] Foreign Application Priority Data

Jan. 15, 1981 [DE] Fed. Rep. of Germany ....... 3101532

[51] Int. Cl.³ .............................................. H02B 1/04
[52] U.S. Cl. ............................... 361/353; 339/198 N; 361/355; 200/44
[58] Field of Search ................................ 200/42 R, 44; 339/198 N, 36, 37; 361/346, 353, 355, 361, 363, 376, 426

[56] References Cited

U.S. PATENT DOCUMENTS

| | | | |
|---|---|---|---|
| 2,707,761 | 5/1955 | Page | 317/119 |
| 2,986,676 | 5/1961 | Edmunds | 361/353 |
| 3,335,330 | 8/1967 | Hall | 339/198 N |
| 3,463,967 | 8/1969 | Klein | 317/119 |
| 4,001,653 | 1/1977 | Olashaw | 361/353 |
| 4,006,324 | 2/1977 | Leasher | 200/44 |
| 4,167,768 | 9/1979 | Baker et al. | 361/355 |

FOREIGN PATENT DOCUMENTS

| | | | |
|---|---|---|---|
| 1214293 | 4/1966 | Fed. Rep. of Germany . | |
| 1962563 | 6/1967 | Fed. Rep. of Germany . | |
| 1665986 | 10/1973 | Fed. Rep. of Germany . | |
| 2757696 | 11/1978 | Fed. Rep. of Germany . | |
| 3037355 | 4/1982 | Fed. Rep. of Germany . | |
| 1181893 | 2/1970 | United Kingdom . | |
| 1414365 | 11/1975 | United Kingdom | 339/37 |

OTHER PUBLICATIONS

Mains Plug Lock, Jun. 1979, No. 326, 0310 Tech. Discl. Bull. Central Electricity Generating Board.
Article entitled "Schaltgerate, Anlagen und Verteiler fur Niederspannung" from ETZ-B Band 21 (1969), pp. 164–167.
Article entitled "Niederspannungs-leistungs-schalter-reihe von 16 bis 4000 A" from Technische Mitteilungen AEG-Telefunken 64 (1974), pp. 122–127.
DIN Standard 43620 Teil 3-Aug. 1976.
Article entitled "Niederspannungs-COMPACT-Schalter von 100 Abis 1250A" from Calor-Emag-Mitteilungen Heft 1, 1975.

Primary Examiner—G. P. Tolin
Attorney, Agent, or Firm—Kenyon & Kenyon

[57] ABSTRACT

Disclosed is a plug-in base for compact low-voltage protective circuit breakers. The plug-in base comprises a mounting plate and two identical plug-in units disposed thereon at opposite ends thereof. Jumper-like contact laminations are disposed in the plug-in units extending parallel to the current path in a mounted protective circuit breaker. The mounting plate has disposed in the area between the plug-in units a cut-out and a strip extending adjacent thereto which are freely accessible. A padlock may be secured through the cut-out to the strip to prevent mounting of a circuit breaker. The mounting plate is further provided with an extension projecting laterally therefrom which cooperates with a safety tripping pin of a circuit breaker. To lengthen the leakage path and to shield the contacts, the plug-in units have projections and ribs which are placed in front of the contact surfaces of the contact laminations facing a mounted circuit breaker.

5 Claims, 5 Drawing Figures

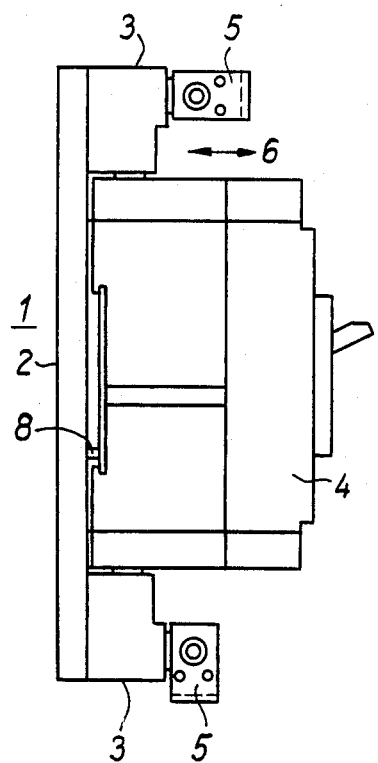
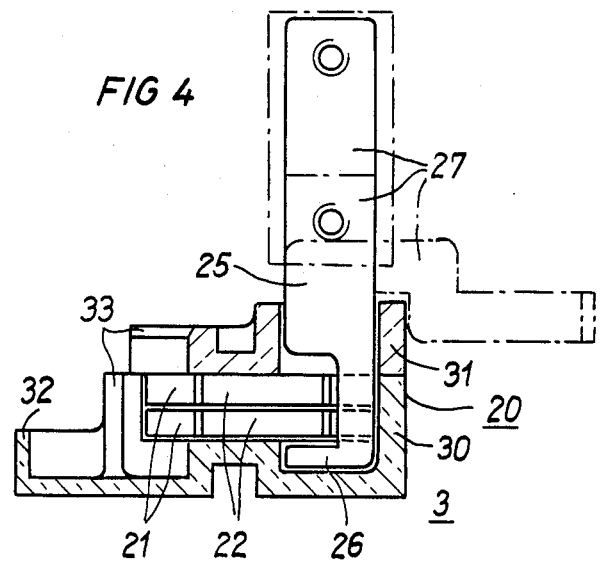
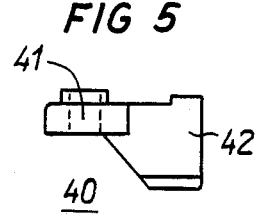
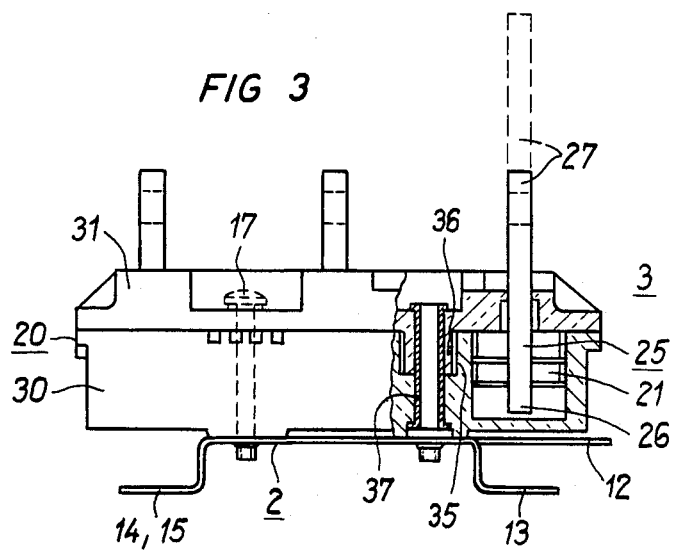

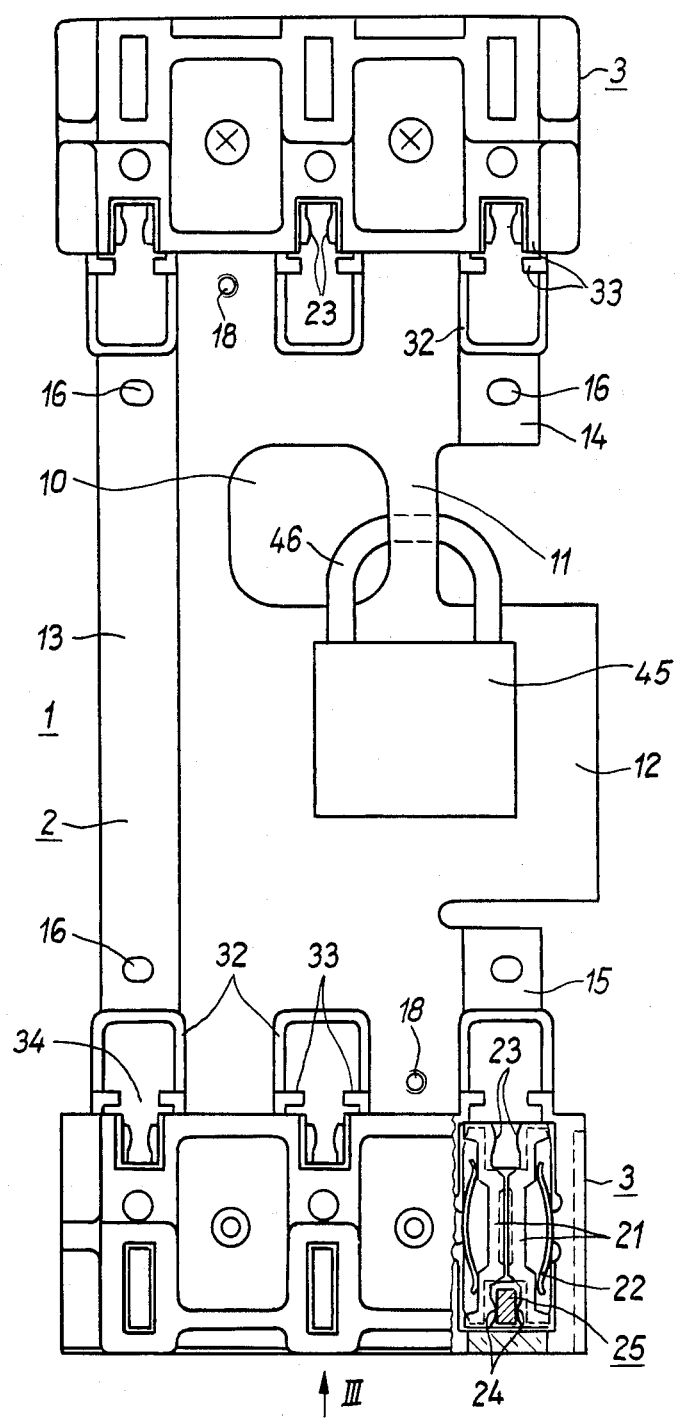

PLUG-IN BASE FOR LOW-VOLTAGE CIRCUIT BREAKERS

BACKGROUND OF THE INVENTION

The present invention relates to a plug-in base for compact low-voltage protective circuit breakers.

A plug-in base for compact circuit breakers is disclosed, for example, in British Patent Specification No. 1,181,893. The housing of a circuit breaker received in the plug-in base of this British specification includes a terminal block which allows terminals of the circuit breaker to be connected to continuous bus bars, and thus circuit breakers can be mounted in an inter-locking manner. Outgoing wires or cables can then be connected at an opposite end face of the base in the customary manner.

U.S. Pat. No. 2,707,761 discloses a protective circuit breaker having spring contact devices disposed on its rear side, which cooperate with stationary knife contacts of a mounting plate. For each protective circuit breaker, a separate mounting plate with contact knives is provided. A number of such mounting plates can be assembled in a rack to form a switching panel.

OBJECT AND SUMMARY OF THE INVENTION

It is an object of the present invention to provide a plug-in base which allows replacement of the protective circuit breaker without disconnecting and reconnecting cables or wires.

This and other objects are achieved, according to the invention by providing a plug-in base having a mounting plate with two identical plug-in units disposed thereon at opposite ends thereof. Each plug-in unit comprises jumper-like contacts extending in parallel to the current path of a circuit breaker mounted to the mounting plate. The contacts receive blade contacts extending from the circuit breaker. The plug-in units form uniform subassemblies which, with equal spacing of adjacent sets of contacts, can be used for breakers of different length. Conventional circuit breakers can co-operate with the contacts and require only simple conductor sections inserted into customary cable or wire terminals or used in place thereof, and which are configured at their outer end as a contact blade. This arrangement can advantageously be used in conjunction with contacts such as those described in DE-PS 1 665 986, with at least two pairs of contacts arranged one behind the other being disposed in the direction of insertion of the circuit breaker. Thereby, relatively small forces are required for inserting and removing a protective circuit breaker, even one of large current-carrying capacity.

In accordance with other aspects of the invention, mounting of a protective circuit breaker to the plug-in base can be prevented as can removal of a protective circuit breaker while under load. The mounting plate is provided with a cut-out therein disposed between the plug-in units and a freely accessible strip extending along the edge of the plate adjacent to the cut-out. The configuration of the plug-in base mounting plate and the plug-in units according to the invention enables the advantageous disposition of the cut-out. A padlock shackle of customary thickness can be inserted through the cut-out about the strip so that contact blades of a protective circuit breaker cannot simultaneously engage both plug-in units of the plug-in base. In this manner, the application of power to a particular circuit, which may be under construction or repair, can be prevented visibly and with certainty.

The mounting plate can include an extension laterally projecting therefrom between the plug-in units. The extension can act as a bearing-surface for a safety tripping pin projecting from the lower part of the protective circuit breaker. Such a tripping pin, which may be arranged in the protective circuit breaker, for example, in accordance with German Patent Application P 30 37 355.8, automatically trips the breaker before the breaker is separated from the plug-in units and before any arcs can be developed at those points. The electric circuit served by the breaker is therefore always properly interrupted before the breaker can be removed.

Preferably, the mounting plate is shaped in its long direction, with the exception of the strip and the extension, in the form of a hat, i.e., it has a hat profile in a transverse sectional view. This imparts sufficient stiffness to the mounting plate and at the same time provides a space in which the padlock can be mounted.

In accordance with another aspect of the invention, the contacts can be protected from unintentional contact by ribs provided at the plug-in units on the side thereof facing a mounted breaker. The ribs define an opening for the contact blades with the contacts being set back by a predetermined safe distance.

According to another aspect of the invention, housings in which the plug-in units are disposed include a projection which extends in the vicinity of the ribs towards a mounted protective circuit breaker, the housing of the breaker having a recess for receiving the projection. This results in a longer leakage path and a reduction of the overall height of the plug-in units.

External cables or wires can be connected to the plug-in units of the plug-in base in different ways. According to an aspect of the invention, external replaceable contacts can be used which are held in the housing of the plug-in units in an inter-locking manner by extending them about the contacts. The same plug-in units are thus suitable for connection in different directions.

The above and other objects, features, aspects and advantages of the invention will be more apparent from the following description of the preferred embodiments of the invention taken in conjunction with the accompanying drawings and appended claims.

BRIEF DESCRIPTION OF THE DRAWINGS

The present invention is illustrated by way of example and not limitation in the figures of the accompanying drawings in which like references indicate similar parts and in which:

FIG. 1 is a schematic side view of a plug-in base according to the invention to which a low-voltage protective circuit breaker is mounted;

FIGS. 2 and 3 are schematic top and front views, respectively, of the plug-in base of FIG. 1 partially in cross-section to show the contacts;

FIG. 4 is a detail of a portion of the plug-in base of FIG. 1 partially in cross-section showing the contacts; and FIG. 5 is a schematic side view of a blade contact of the circuit breaker shown in FIG. 1.

DESCRIPTION OF THE PREFERRED EMBODIMENTS

The arrangement shown schematically in FIG. 1 comprises a plug-in base designated generally by 1 which comprises a mounting plate 2 and two plug-in units 3 fastened thereon. A compact low-voltage protective circuit breaker 4 having an insulating housing is mounted with its contact elements received in those of the plug-in units. The protective circuit breaker 4 shown in outline may, for example, be of the type described in DE-AS 2 757 696.

Plug-in units 3 are provided with terminal connecting devices 5 for connection to bus bars. The protective circuit breaker 4 can be lifted from the plug-in base 1 in the direction of the arrow 6. This requires merely the loosening of a securing element, for example, a screw, which prevents the protective circuit breaker from being separated from the plug-in unit 3 in its operating position shown in FIG. 1.

Referring to FIGS. 1, 2 and 3, the mounting plate 2 of the plug-in base 1 in its lengthwise direction is shaped in the form of a hat (FIG. 3) and may advantageously be made of sheet steel. While the left side (with reference to FIG. 2) of the mounting plate 2 extends from top to bottom continuously and is angled-off, the right side is not continuous but is interrupted. A cutout 10 is formed between the right and left sides with a strip 11 disposed adjacent to the opening joining the upper and lower portions of the mounting plate along the right side thereof. The purpose of the opening and strip will be described below. Adjacent to the strip 11, the mounting plate 2 has a lateral extension 12, the purpose of which will also be described below. Legs 13, 14 and 15 (FIGS. 2 & 3) for mounting the plate on a rack or frame are provided with holes 16 for fasteners. The cutout 10, strip 11, the extension 12 and the holes 16 are located in the area of the mounting plate 2 between the two plug-in units 3.

The plug-in units 3 are identical and are fastened in mirror-image symmetry adjacent to the ends of the mounting plate 2 by means of screws 17 or suitable fasteners. As shown in FIG. 2, two tapped holes 18 are provided in the area of the mounting plate between the plug-in units 3 for fastening a protective circuit breaker thereto as shown in FIG. 1.

The construction of the plug-in units 3 will now be described with reference to FIGS. 2, 3 and 4. Each plug-in unit illustrated in the drawings includes three poles so as to cooperate with conventional protective circuit breakers which have three poles. Accordingly, each plug-in unit has three sets of contact elements which are arranged side by side in an insulating housing 20, only one contact element being visible in the broken-away portion of FIGS. 2–4. The contact elements are comprised of jumper-like contacts 21 which are arranged in pairs oppositely disposed to each other and are resiliently biased by leaf springs 22. The contacts have contact areas 23 and 24 at opposite ends thereof. Contact areas 23 are provided on the side of the plug-in unit facing a protective circuit breaker inserted therein and cooperate with conductor sections projecting from the terminal devices of the protective circuit breaker. Contact areas 24 are in continuous connection with a conductor section 25 (FIG. 3) which extends under and is inter-locked with two pairs of contacts 21 in hook fashion by means of an extension 26. The outer end 27 of the extension is configured in accordance with a particular type of contact to be employed.

The housings 20 of the plug-in units 3 have recesses which are formed by a lower housing part 30 and an upper housing part 31 and receive the contacts 21. The lower part 30 is provided with trough-like projections 32 (FIG. 4) in the region of each set of contacts. The projections 32 protrude with respect to the contact areas 23 and engage in corresponding recesses on the underside of the breaker housing when a protective circuit breaker is mounted to the plug-in unit. The projections 32 lengthen the leakage path relative to the mounting plate 2 in such a way that the usual overall height of a protective breaker arrangement can be retained. Furthermore, ribs 33 of the lower part 30 and the upper part 31 form enclosures 34 (FIG. 2) which protect the contacts when the protective circuit breaker is removed.

As shown in FIG. 3, the lower part 30 and the upper part 31 of the plug-in unit 3 engage each other in an interlocking manner. A post 36 provided in the upper part 31 is received in a depression 35 provided in the lower part 30, with the upper and lower parts being connected thereat by a tubular rivet 37, for example. By joining the two housing parts together, the recesses in which the two pairs of contacts 21 with their leaf springs 22 are disposed are closed off. The contacts run parallel to the current paths of a protective circuit breaker which is to be mounted and come successively into engagement with the blade contact sections of the protective circuit breaker when the latter is plugged in. Thereby, electrical and mechanical properties can be achieved such as described, for example, in DE-PS 1 665 986.

The plug-in base 1 can be arranged in a switching cabinet or a control panel in numbers as required, i.e., singly or multiply disposed side by side. The protective circuit breakers of the size corresponding to the plug-in base are provided with blade contacts which may have, for example, the configuration shown in FIG. 5. The blade contacts 40 are inserted into frame terminals which are typically provided in compact protective circuit breakers or in place of such frame terminals and accordingly have a cylindrical hole 41. The blade part 42 which extends at a right angle to the longitudinal axis of the hole 41 is adapted to be engaged between the contacts 21. The contact blades 42 come into engagement successively, with the upper and then with the lower pair of contacts 21, i.e., in the direction of the arrow 6 in FIG. 1. The force required to insert the breaker is thus substantially reduced.

The projections 32 at the lower housing part 30 of the plug-in units 3 engage in fitting recesses which are provided on the underside of the housing of the protective circuit breaker. When the protective circuit breaker is equipped with a safety tripping pin such as pin 8 in FIG. 1, the pin is pushed-in by bearing against the surface of extension 12 when the protective circuit breaker is mounted and held in the pushed-in position by screws in tapped holes 18 (FIG. 2). The breaker can then be manually switched on and off in the usual manner, or it can be tripped automatically. If, on the other hand, the protective circuit breaker is removed from the plug-in base 1 in a closed circuit condition, then the safety tripping pin causes the breaker to trip and thereby, an interruption of the circuit before the contact blades 40 leave the contacts 21. This prevents arcs at the plug-in units 3 which could be hazardous to operating personnel.

To prevent a circuit breaker from being mounted in a circuit under test or repair and to visibly indicate that such a circuit is open, a padlock 45 (FIG. 2) can be locked onto a plug-in unit 3 in its voltage-free condition. The shackle 46 of padlock 45 is disposed about strip 11 of the mounting plate 2 and locked into the opening or cut-out 10. The strip 11 is set back from the edge of the mounting plate 2 sufficiently so that a padlock of conventional size fits within the confines of the plug-in base. Therefore, the use of a padlock will not prevent several plug-in bases 1 from being mounted in a side by side relationship. The shackle 46 of the padlock 45 prevents the blade contacts of a protective circuit breaker from simultaneously engaging both opposite plug-in units 3. The absence of voltage at a work or construction site can thereby be assured.

The advantages of the present invention, as well as certain changes and modifications of the disclosed embodiments thereof, will be readily apparent to those skilled in the art. It is the applicant's intention to cover by his claims all those changes and modifications which could be made to the embodiments of the invention herein chosen for the purpose of the disclosure without departing from the spirit and scope of the invention.

What is claimed is:

1. The combination of a low voltage circuit breaker and a plug-in base for the circuit breaker, the plug-in base comprising a mounting plate and two identical plug-in units disposed on opposite sides of the plate, each unit comprising a housing and a contact arrangement disposed in the housing, each contact arrangement comprising a first contact and a second contact electrically connected together, the first contact facing a central part of the plug-in base, the circuit breaker including two spaced contacts and the first contact of each plug-in unit contact arrangement mating with a respective contact of the circuit breaker, the second contact of each plug-in unit contact arrangement being disposed on a side of the first contact away from the central part of the base, and connecting elements mating with the second contact of each plug-in unit contact arrangement for connecting a respective second contact in a circuit, each connecting element including an extension extending at an angle therefrom which is removably engaged by a respective second contact in an interlocking manner.

2. The combination according to claim 1 wherein the mounting plate includes a cut-out therein disposed between the plug-in units, with a freely accessible strip extending adjacent to the cut-out, the strip being adapted to receive the shackle of a padlock.

3. The combination according to claim 2 wherein the mounting plate is profiled except for the strip in its long direction in the form of a hat.

4. The combination according to claim 1 wherein the housing of each plug-in unit includes ribs disposed on the side thereof facing the central part of the base and defining an opening through which the respective contact of the protective circuit breaker extends, each plug-in unit contact arrangement including a pair of contact elements forming at one end a first receptacle constituting the first contact of the respective circuit arrangment and forming at an opposite end a second receptacle constituting the second contact of the respective circuit arrangement, the first receptacle receiving a respective contact of the circuit breaker and the second receptacle receiving a respective connecting element, the plug-in units including means resiliently biasing the contact elements.

5. The combination according to claim 4 wherein the housing of each plug-in unit includes a projection extending in the region of the ribs towards the central part of the base and the circuit breaker including a recess in which the projection is received.

* * * * *